Aug. 31, 1954

L. E. MARCHANT ET AL
COPYING MACHINE TOOL 2,687,676

Filed April 12, 1951

INVENTORS
L.E.MARCHANT
C.F.FARR
PER

ATTORNEY

Aug. 31, 1954   L. E. MARCHANT ET AL   2,687,676
COPYING MACHINE TOOL
Filed April 12, 1951
4 Sheets-Sheet 2

INVENTORS
L.E. MARCHANT
C.P. FARR
PER
ATTORNEY.

Aug. 31, 1954    L. E. MARCHANT ET AL    2,687,676
COPYING MACHINE TOOL
Filed April 12, 1951    4 Sheets-Sheet 3
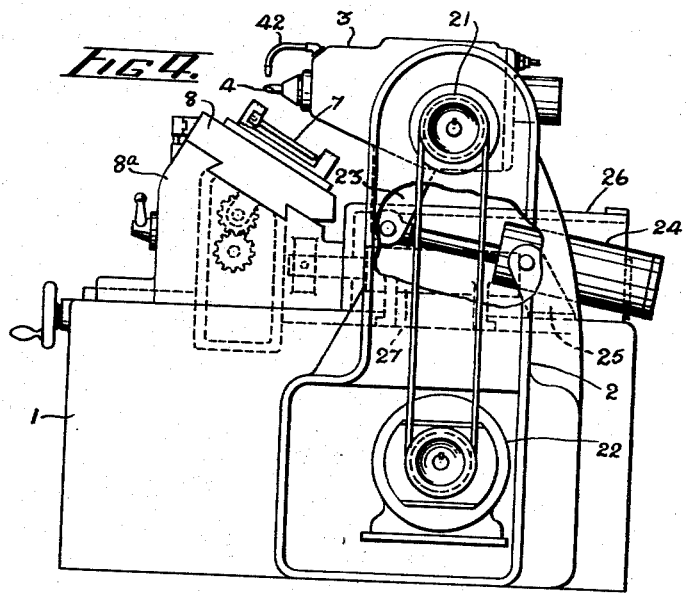
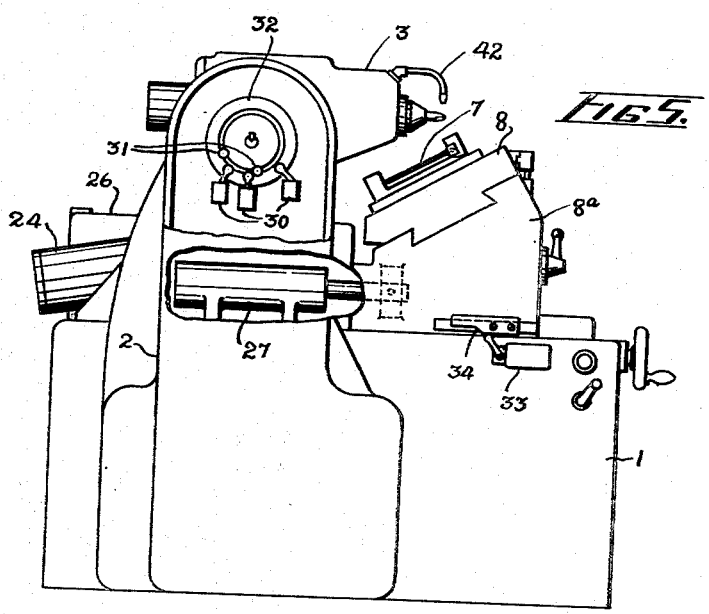
INVENTORS
L.E.MARCHANT
C.P.FARR
PER
ATTORNEY Aug. 31, 1954
L. E. MARCHANT ET AL
2,687,676
COPYING MACHINE TOOL
Filed April 12, 1951
4 Sheets-Sheet 4
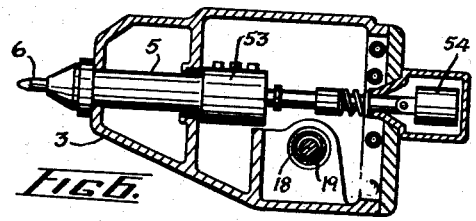
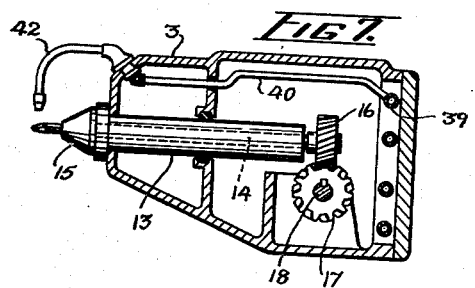
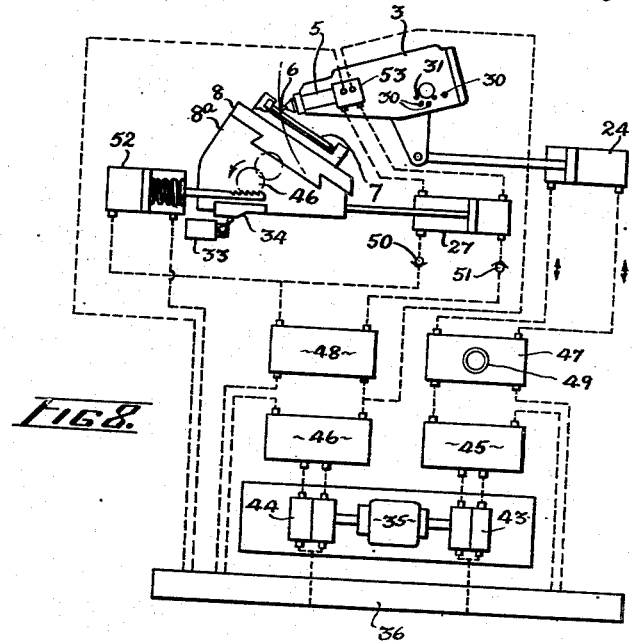
INVENTORS
L.E. MARCHANT
C.P. FARR
PER
ATTORNEY Patented Aug. 31, 1954

2,687,676

UNITED STATES PATENT OFFICE 2,687,676

COPYING MACHINE TOOL

Lawrence Edgar Marchant, Toronto, Ontario, and Clifford Phoenix Farr, Swansea, Ontario, Canada, assignors to A. V. Roe Canada Limited, Malton, Ontario, Canada, a corporation Application April 12, 1951, Serial No. 220,572

3 Claims. (Cl. 90—13.5)

The invention relates to pattern controlling multi-spindle machine tools of the kind utilizing a tracer having a scanning element which controls a power drive producing relative movement between a table which supports a pattern and a plurality of workpieces, and a tool head on which are mounted a tracer and cutting tools adapted to engage the pattern and the workpieces respectively.

In the operation of such machine tools, if the tool head remains stationary it is necessary to move the table simultaneously in two planes at right angles, to cause the scanning element of the tracer to follow the contour of the pattern. If, however, a simpler table construction is utilized in which the table is arranged to move in only one plane, then it is necessary to make provision for movement of the scanning element and the cutting tools carried by the tool head in a plane at right angles to the plane of movement of the table. It is not an easy matter to arrange this in a machine having a multi-spindle tool head and incorporating the necessary drives for the tools, if a relatively simple and practical design of machine tool is to be produced which will machine simultaneously a plurality of workpieces to a high degree of accuracy. However, there is a demand for such a machine in the manufacture of gas turbine engines for machining the blanks for multi-stage turbine and compressor blades, which differ in shape at various stages throughout the engine, and the economical production of which constitutes a difficult manufacturing problem.

The main object of the present invention is, therefore, to provide a pattern controlled multi-spindle machine tool, which, whilst being of relatively simple construction, will enable several workpieces to be accurately machined simultaneously to the same shape as a common pattern.

In such a machine tool, the pattern is advantageously mounted on the table so that the scanning element of the tracer moves over the pattern in a general direction substantially parallel to the longitudinal axis of the said pattern. Where portions of the surface of the pattern are steeply inclined, for example, to form a right angle corner which has to be traversed by the scanning element, the pattern may be mounted so that its longitudinal axis is inclined to the longitudinal axis of the tracer during the entire tracing stroke, whereby the scanning element of the tracer is enabled to enter more readily such a corner and thus follow accurately the surface of the pattern.

To permit such an inclined mounting of the pattern and workpieces, in accordance with a further feature of the present invention the surface of the table on which the pattern and workpieces are mounted is disposed in a plane which is parallel to the pivotal axis of the tool head, but is inclined to the direction of travel of the reciprocating table.

Another problem which arises in the construction of such a multi-spindle machine tool is that, due to the length of the tool head carrying, for example, fourteen tool spindles arranged side by side, and the correspondingly long table for the pattern and workpieces, relative displacement of these parts tends to occur due to unequal expansion caused by the heat generated by the operation of the machine tool. Therefore according to a further feature of the invention, means are provided to prevent, or reduce to a negligible value, relative displacement due to expansion of the various coacting parts of the machine, particularly the tool spindles and the corresponding mountings for the workpieces.

The invention is more particularly described with reference to the accompanying drawings, in which like reference characters designate corresponding parts throughout the several views and in which:

Figure 4 is an elevation of one side of the said machine tool;

Figure 5 is an elevation of the opposite side of the said machine tool;

Figure 6 is a section through the tool head on the line VI—VI of Figure 3;

Figure 7 is a section through the tool head on the line VII—VII of Figure 3; and Figure 8 is a diagram of the hydraulic system of the machine tool.

Figure 1:
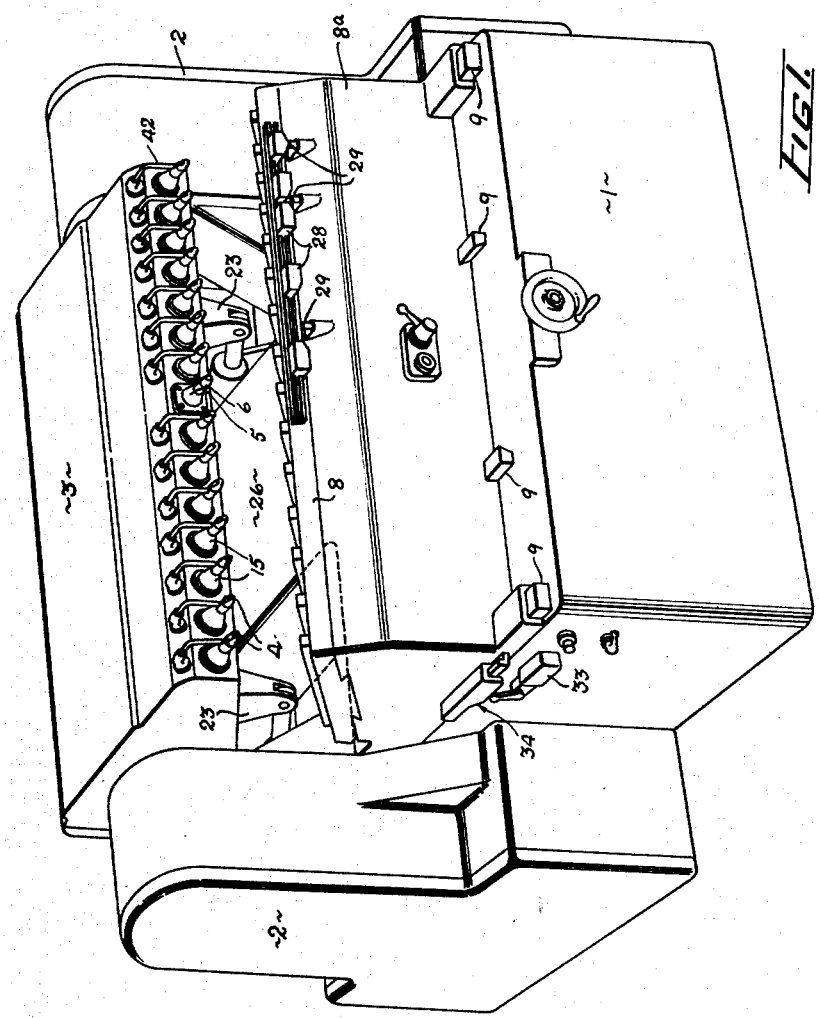
Figure 1 is a front perspective of a multi-spindle pattern controlled machine tool constructed in accordance with the invention.

The embodiment of the invention illustrated in the accompanying drawings is a pattern controlled machine tool which is particularly adapted for simultaneously machining fourteen gas turbine engine blade blanks to the same shape as a pattern.

The general arrangement of this machine tool comprises a frame which includes a hollow base 1 having at each side hollow vertical stanchions 2. Extending horizontally between the upper ends of the stanchions 2 is a tool head 3 comprising a hollow housing which is pivotally mounted at opposite ends in the stanchions 2. The tool head 3 carries fourteen milling cutters 4 and a tracer 5, the scanning element 6 of which is disposed centrally of the group of milling cutters 4 and in line therewith. A power drive which is hereinafter more fully described is provided to oscillate the tool head 3 about its pivotal axis so that the scanning element 6 and the cutters 4 move in an arcuate path.

Figure 2:
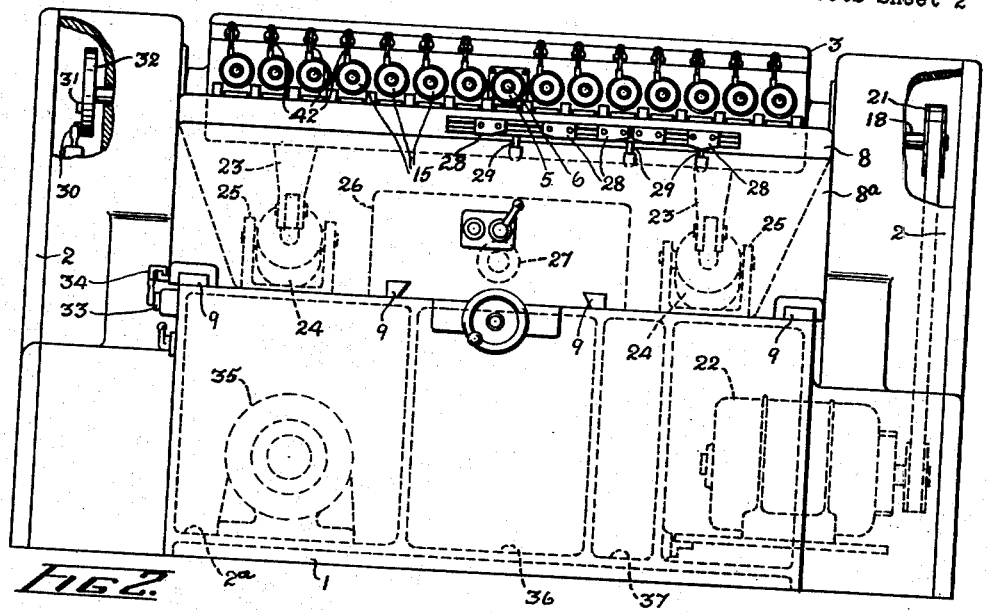
Figure 2 is a front elevation of the said machine tool.

The scanning element 6 and the cutters 4 engage respectively a pattern and workpieces 7 (Figure 2) mounted on a table 8 supported by another table hereinafter referred to as the sub-table 8a. The sub-table 8a is mounted on two pairs of horizontal slideways 9 for rectilinear movement in a direction transverse to the pivotal axis of the tool head 3. The tool head 3 is oscillated by a power drive about its pivotal axis and thus a steady arcuate down cutting stroke is imparted to the cutters 4 as the scanning element 6 moves in a corresponding arcuate path, whilst a power drive controlled by the tracer 5 reciprocates the sub-table 8a to maintain the scanning element 6 in contact with the pattern on the table 8 during the entire cutting stroke of the cutters 4, in accordance with the well known manner of operation of such tracers.

Having outlined the general construction of the illustrated embodiment of the machine tool, its more important detail features will now be described.

Figure 3:
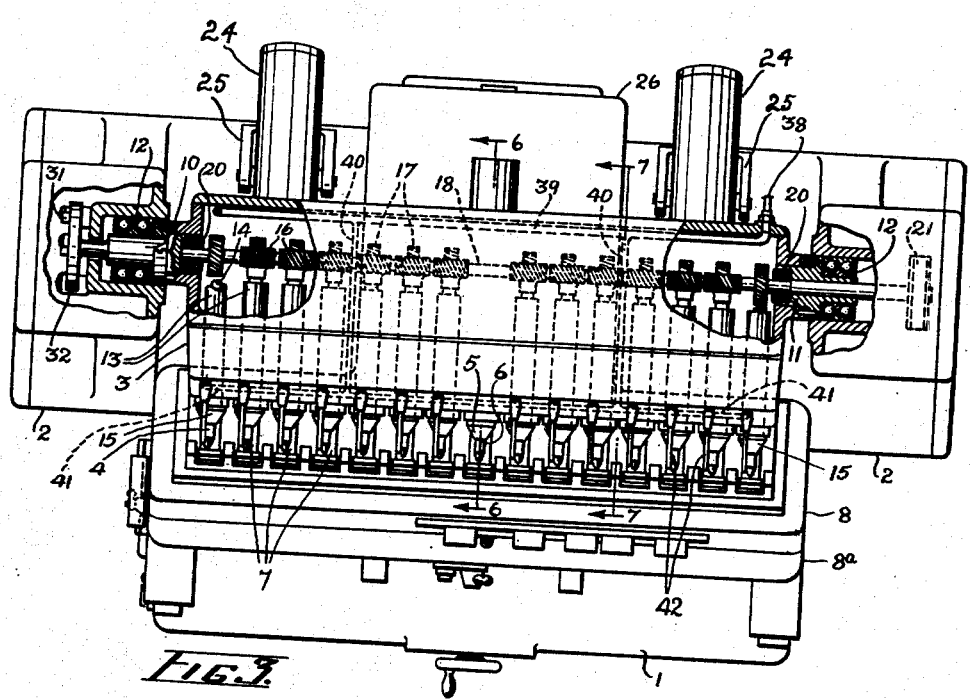
Figure 3 is a plan, partly in section, of the said machine tool.

At opposite ends of the tool head 3 are provided bored bosses to which are bolted coaxial flanged trunnions 10 and 11 respectively (see Figure 3); the trunnions are journalled for pivotal movement in coaxial bearings 12 provided in bores formed in the stanchions 2. In the tool head 3 are mounted fourteen cylindrical quills 13 in each of which is journalled a driving spindle 14 which supports at one end a chuck 15 for a cutting tool, such as a milling cutter 4. The quills 13 and the tracer 5 are arranged in such a manner that the axes of the driving spindles 14 and of the tracer 5 are parallel to one another in a common plane and at right angles to the pivotal axis of the tool head 3. At the other end of each driving spindle 14 is keyed a helical spur gear 16 which meshes with a helical spur gear 17 mounted on a common driving shaft 18 which powers all the spindles 14. The driving shaft 18 which is coaxial with the pivotal axis of the tool head 3 is journalled in bearings 19 (Figure 6) provided in the tool head and also in bearings 20 provided in the trunnions 10 and 11. As shown in Figure 3, one end of the driving shaft 18 extends through a bore in the trunnion 11, and on the said end of the shaft is keyed a driving pulley 21 connected by belts to power means such as a driving motor 22 arranged in the base 1.

On the tool head 3 are provided two spaced downwardly extending eccentric arms 23, the ends of which are coupled to the piston rods of a pair of hydraulic cylinder and piston assemblies 24 trunnioned in brackets 25 secured to the top of the base 1. The assemblies 24 constitute the power drive for oscillating the tool head 3 about its pivotal axis thus moving the milling cutters 4 and the scanning element 6 in an arcuate path.

The sub-table 8a comprises a hollow casting which in plan is of T-shape (Figure 3), having a portion 26 (the leg of the T) which extends beneath the tool head 3 and between the arms 23. Mounted on the base 1 beneath the portion 26 is a hydraulic cylinder and piston assembly 27, the piston rod of which is coupled to the sub-table 8a. This assembly constitutes a power drive for reciprocating the sub-table, and is controlled by the tracer 5 as will be more fully described hereinafter.

The table 8 is mounted on a transverse slideway on the sub-table 8a, and is indexed by small increments in a direction perpendicular to the direction of the cutting stroke of the tool head by an indexing mechanism of known type incorporated in the sub-table; the indexing mechanism is controlled by the strokes of the reciprocating sub-table 8a. The surface of the table 8 on which the pattern and workpieces 7 are mounted is disposed in a plane which is parallel to the pivotal axis of the tool head 3 and which is inclined to the direction of travel of the reciprocating sub-table 8a (see Figures 4 and 5). This arrangement facilitates the mounting of the pattern and workpieces on the table 8 with their major surfaces or longitudinal axes inclined to the direction of travel of the reciprocating table so that the scanning element 6 is enabled to follow the contour of, for example, a right-angled corner in the pattern surface.

A slideway is provided on one side of the table 8 for a number of adjustable cams or dogs 28 (Figure 1) which, during the index travel of the table 8 across the sub-table 8a, actuate a series of coacting plungers 29 mounted on the sub-table. The plungers 29 actuate limit switches forming a part of the electrical system (not shown) which controls the hydraulic power drives of the machine tool, hereinafter more fully described. The electrical system also includes a series of limit switches 30 mounted in the left hand stanchion 2, these switches being actuated by abutments 31 adjustably mounted in a circular groove formed in the face of a disc 32 carried by an extension of the trunnion 10. Another limit switch 33 in the electrical system is mounted on the left hand side of the base 1 and is actuated by a cam or dog 34 adjustably mounted on a slideway on the side of the sub-table 8a.

The hollow base 1 is divided into four main compartments; the left hand compartment 2a houses a hydraulic pump unit 35; the next adjacent portion constitutes a reservoir 36 for the hydraulic fluid used in the operation of the machine tool; another compartment provides a reservoir 37 for the coolant used in the machining operations; and the right hand compartment provides with the right hand stanchion 2 a housing for the driving motor 22 for the driving spindles 14.

In a multi-spindle machine having a long tool head and a correspondingly long worktable, accuracy of reproduction may be affected by unequal expansion of various portions of the machine, due to heat generated by the friction of the moving parts. In order to obviate or minimize this unequal expansion, the coolant for use in the machining operations is first led to an inlet connection 38 and then passes through a heat exchanger which includes a coil 39 mounted within the hollow housing of the tool head 3 adjacent to the common driving shaft 18, which, incidentally, tends to become the hottest part of the tool head. After passing through the coil 39 the coolant is lead to other components of the heat exchanger, namely transverse passages 40 and longitudinal passageways 41 formed in the front part of the tool head 3. The longitudinal passageways 41 are connected by an outlet to flexible feed pipes 42 for directing the coolant to the cutters 4. The heated coolant from the pipes 42 flows over the table 8 and raises its temperature to correspond to that of the tool head. In some machines constructed in accordance with the invention, more elaborate temperature controlling means may be provided. For example, thermostatically controlled electric heating elements may be mounted in the table 8.

Referring to Fig. 8, which illustrates diagrammatically the hydraulic operating mechanism of the machine, the hydraulic fluid is stored in the reservoir 36. The hydraulic pump unit 35 comprises an electric motor coupled to two pumps 43 and 44 drawing oil from the reservoir 36. Each pump includes a small and a large volume feed unit, for example supplying one and eleven gallons per minute respectively, the pump 43 being connected to an unloading valve 45 and the pump 44 being connected to an unloading valve 46. Each valve 45 or 46 normally delivers the combined flow from the pump 43 or 44 corresponding thereto. However, with a pressure rise beyond a predetermined value due to a sufficient increase in the resistance to the flow of fluid from a pump, the unloading valve of such pump operates to return the fluid from the large volume feed unit of the pump directly to the reservoir 36, only the small volume feed unit continuing to supply fluid under pressure. This is done to save power and minimize heating of the hydraulic fluid when only slow speed operation of the hydraulic mechanism is required.

The unloading valves 45 and 46 supply fluid to electrically controlled hydraulic reversing valves 47 and 48 respectively. The valve 47 is connected to the hydraulic cylinder and piston assemblies 24, and, depending on its setting, it causes the pistons to move in or out and thus moving the cutters 4 and the scanning element 6 carried by the tool head 3 down or up. The cutters 4 and element 6 are raised rapidly under the combined flow of the pump 43. When the valve 47 is actuated to reverse the flow of fluid to move the tool head down, the fluid is directed through a port (not shown) in the valve 47, the area of which is adjustable by a speed control knob 49, to vary the speed of the "down" or cutting stroke of the tool head 3. This port also constitutes a resistance to the flow of fluid sufficient to cause the unloading valve 45 to operate so that the tool head is driven down on the cutting stroke solely by the small volume feed of the pump 43.

The electrically operated hydraulic reversing valve 48 is connected to the hydraulic cylinder and piston assembly 27 for actuation of the sub-table 8a. One-way valves 50 and 51 are coupled in the connecting pipes in such a manner that fluid from the valve 48 can move the piston of assembly 27 "in" only, to draw the table 8 towards the scanning element 6 of the tracer 5. The valve 48 is also connected to a hydraulic cylinder and piston assembly 52 for indexing the table 8 across the sub-table 8a.

When the valve 48 is actuated to supply fluid to the cylinder and piston assembly 27 for the "in" feed of the sub-table 8a, and also to the cylinder and piston assembly 52, the piston of assembly 52 first makes its indexing stroke, and then, as pressure increases, the fluid flows through the valve 50 to move the table rapidly "in" towards the scanning element 6. When the table has travelled a distance predetermined by the setting of the cam 34, the limit switch 33 is operated to cause reversal of the flow from the valve 48. Since, however, the fluid cannot flow to the cylinder of assembly 27 through the one-way valve 51, the resulting pressure increase causes the unloading valve 46 to operate to supply only a small volume feed. The unloading valve 46 is also connected to the valve mechanism 53 of the hydraulic tracer 5, and the tracer 5 now takes complete control of the movement of the table using the small volume feed to bring the pattern on the table 8 into contact with the scanning element 6 of the tracer. The downward stroke of the cutters 4 and element 6 carried by the tool head is also started when the cam 34 operates the limit switch 33, since the said limit switch also causes actuation of the valve 47 to initiate this downward stroke. The scanning element 6 of the tracer now follows the contour of the pattern during the arcuate downward stroke of the cutters 4 and element 6 since the movements of the table carrying the pattern are now under the control of the tracer 5. In the arrangement of the parts illustrated in the drawings, the table is moved generally "out," away from the tool head, under the control of the tracer 5 during the down arcuate stroke of the cutters 4 and the element 6.

The termination of the downward stroke of the cutters 4 and element 6 is controlled by one of the limit switches 30 which cause actuation of the reversing valve 47 to produce a rapid reverse movement of the tool head, under the combined delivery of the pump 43. One of the limit switches 30 also controls the top position of the cutters 4 and element 6 and causes actuation of the reversing valve 47 to stop the tool head when the cutters 4 and element 6 are at the top of their arcuate stroke. This same limit switch also actuates the valve 48 to initiate another in-feed of the sub-table 8a to repeat the cycle.

In operation, the hydraulic pump unit is first started to furnish fluid under pressure for actuation of the hydraulic drives. Then a pattern and workpieces, such as gas turbine engine blade blanks, are mounted on the table 8 and suitable milling cutters 4 are mounted in the chucks 15 and aligned with the scanning element 6 of the tracer 5, the shape of the tip of the element 6 corresponding to that of the cutting portion of the milling cutters 4. The pattern and workpieces are positioned so that when the sub-table 8a is in the "in" position, and the cutters 4 and element 6 of the tool head are at the top of their stroke, a slight rotation of the tool head will bring the scanning element 6 in contact with the top of the pattern at a point corresponding to where it is desired to commence the machining of the workpieces by the cutters 4. The cam 34 is set to actuate the limit switch 33 at this "in" position of the sub-table 8a. The first cutting stroke is made at one side of the workpieces and since the table 8 is indexed by, for example, .010 inch steps across the sub-table 8a at the commencement of each down cutting stroke of the tool head, the entire surface of the pattern will eventually be reproduced.

Having thus set up the machine tool, the motor 22 is started to drive the cutters 4 and then the valve 48 is actuated to initiate rapid "in" feed of the sub-table 8a. When the table 8 has been indexed across the sub-table 8a so that the whole width of the pattern has been reproduced, one of the plungers 29 (Figure 2) is depressed to operate a limit switch causing actuation of a solenoid 54 (Figure 6). The solenoid 54 actuates the valve mechanism 53 to cause the table to be moved "out." The last mentioned limit switch moreover over-rides the limit switch 30 which otherwise would have initiated another "in" feed of the table.

Some of the cams or dogs 28 may be positioned to actuate some of the plungers 29 during the index feed of the table 8 across the sub-table 8a, and the thus depressed plungers may actuate limit switches (not shown) coacting with the limit switches 30 to vary the lower position of the stroke of the cutters 4 and scanning element 6 of the tool head, during an operating cycle of the machine.

It is to be understood that the form of the invention herewith shown and described is to be taken as a preferred example of the same, and that various changes in the shape, size and arrangement of the parts may be resorted to, without departing from the scope of the claims.

What we claim as our invention is:

1. A pattern controlled machine tool for simultaneously machining a plurality of blanks to identical configurations which correspond to the configuration of a pattern, comprising a frame, a tool head mounted on the frame for rocking movement about a pivotal axis, a tracer and a plurality of driving spindles for cutting tools, the tracer and the driving spindles being mounted in the tool head with their axes parallel to one another and in a plane parallel to the pivotal axis of the tool head, a unitary table mounted on the frame for rectilinear movement in a plane parallel to the pivotal axis of the tool head and in a direction transverse thereto, a power drive for reciprocating the table, the table being adapted to support a pattern and a plurality of workpieces, the tracer being adapted to engage the pattern and the cutting tools carried by the spindles being adapted to engage the respective workpieces, power means to rotate the spindles about their axes, a power drive coupled to the tool head for rocking the tool head in a constant arcuate path thus providing an arcuate cutting stroke to the cutting tools on the spindles as the tracer scans the pattern in a corresponding arcuate path, and means responsive to the tracer to control one of the power drives and thus continually to position the table relative to the arcuately travelling tracer and cutting tools in accordance with the configuration of the pattern scanned by the tracer to cause reproduction of the pattern configuration on the workpieces.

2. A pattern controlled machine tool for simultaneously machining a plurality of blanks to identical configurations which correspond to the configuration of a pattern, comprising a frame, a tool head mounted on the frame for rocking movement about a pivotal axis, a tracer and a plurality of driving spindles for cutting tools, the tracer and the driving spindles being mounted in the tool head with their axes parallel to one another and in a plane parallel to the pivotal axis of the tool head, a unitary table mounted on the frame for rectilinear movement in a plane parallel to the pivotal axis of the tool head and in a direction transverse thereto, a power drive for reciprocating the table, the table having a surface for supporting a pattern and a plurality of workpieces, the said table surface being inclined relative to the plane of movement of the table and parallel to the pivotal axis of the tool head, the tracer being adapted to engage the pattern and the cutting tools carried by the spindles being adapted to engage the respective workpieces, power means to rotate the spindles about their axes, a power drive coupled to the tool head for rocking the tool head in a constant arcuate path thus providing an arcuate cutting stroke to the cutting tools on the spindles as the tracer scans the pattern in a corresponding arcuate path, and means responsive to the tracer to control one of the power drives and thus continually to position the table relative to the arcuately travelling tracer and cutting tools in accordance with the configuration of the pattern scanned by the tracer to cause reproduction of the pattern configuration on the workpieces.

3. A pattern controlled machine tool for simultaneously machining a plurality of blanks to identical configurations which correspond to the configuration of a pattern, comprising a frame having two spaced stanchions, a journal bearing in each stanchion, the said bearings being coaxial, a hollow housing, trunnions at opposite ends of the housing journalled in the stanchion bearings and supporting the housing for rocking movement, a tracer extending from the housing and a plurality of cutting tool driving spindles mounted inside the housing and having a tool supporting end extending outside the housing, the axes of the tracer and of the driving spindles being parallel to one another and in a plane parallel to the rocking axis of the tool head, a table mounted on the frame for rectilinear movement in a plane parallel to the rocking axis of the housing and in a direction perpendicular to the said axis, a power drive coupled to the table for reciprocating the table, a second table mounted on the first mentioned table for movement in a plane and in a direction parallel to the rocking axis of the hollow housing, means responsive to the reciprocating strokes of the first mentioned table for indexing the second table, the second table having a surface for supporting a pattern and a plurality of workpieces, the said table surface being inclined relative to the plane of movement of the first table and parallel to the rocking axis of the housing, the tracer being adapted to engage the pattern and the tools supported by the driving spindles being adapted to engage the respective workpieces, a shaft rotatably mounted in the housing coaxially with the rocking axis of the housing and having one end extending through a housing trunnion, power means outside of the housing connected to the end of the shaft which extends through a housing trunnion to rotate the shaft, gears on the shaft and on the other end of each driving spindle for coupling the shaft and the spindles, a power drive coupled to the tool head for rocking the tool head in a constant arcuate path thus providing an arcuate cutting stroke to the cutting tools on the spindles as the tracer scans the pattern in a corresponding arcuate path, and means responsive to the tracer to control the table power drive and thus continually to position the table relative to the arcuately travelling tracer and cutting tools in accordance with the configuration of the pattern scanned by the tracer to cause reproduction of the pattern configuration on the workpieces.

References Cited in the file of this patent

UNITED STATES PATENTS

| Number | Name | Date |
|---|---|---|
| 895,383 | Mangels | Aug. 4, 1908 |
| 957,716 | Salstorm | May 10, 1910 |
| 1,058,384 | Peters | Apr. 8, 1913 |
| 1,527,705 | Rogers | Feb. 24, 1925 |
| 1,689,108 | Breed | Oct. 23, 1928 |
| 2,089,099 | Roehm et al. | Aug. 3, 1937 |
| 2,111,332 | Roehm | Mar. 15, 1938 |
| 2,118,514 | Johnson | May 24, 1938 |
| 2,379,037 | Rosen | June 26, 1945 |
| 2,384,225 | Wilson | Sept. 4, 1945 |
| 2,447,446 | Wilder et al. | Aug. 17, 1948 |